C. WATSON.
FRUIT GRADER.
APPLICATION FILED MAR. 8, 1912.
1,030,552.
Patented June 25, 1912.
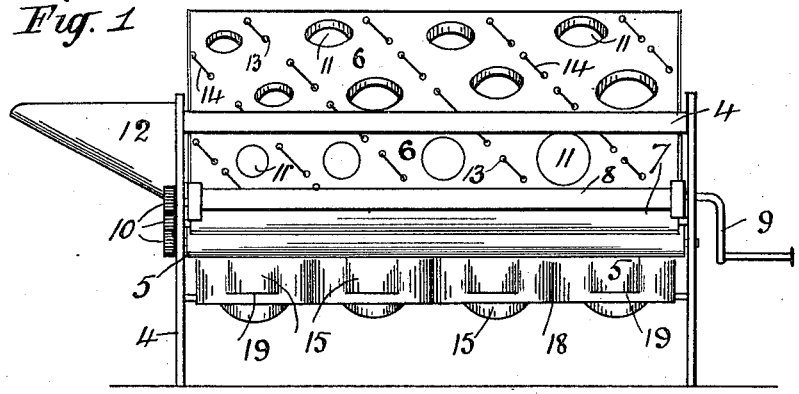
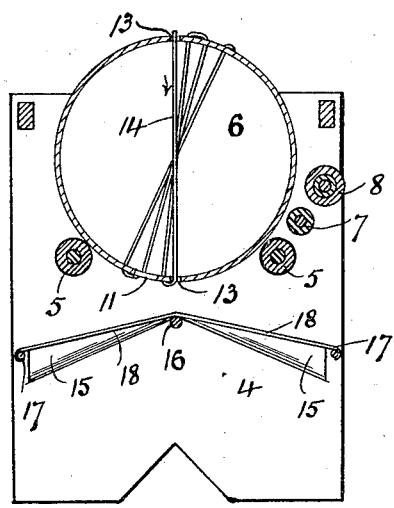
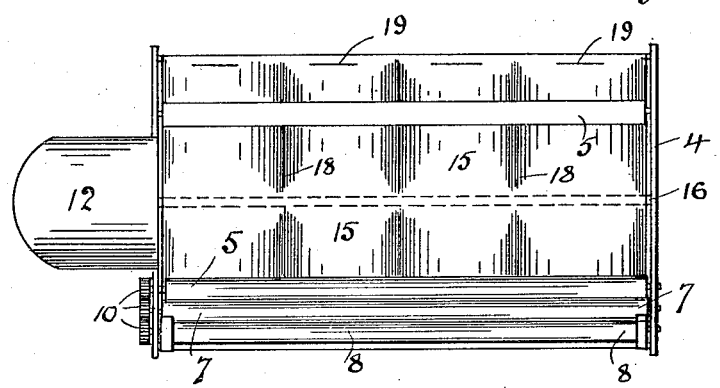

UNITED STATES PATENT OFFICE.

CHARLES WATSON, OF GLEN HUON, TASMANIA, AUSTRALIA.

FRUIT-GRADER.

1,030,552.  Specification of Letters Patent.  Patented June 25, 1912.

Application filed March 8, 1912. Serial No. 682,521.

*To all whom it may concern:*

Be it known that I, CHARLES WATSON, a subject of the King of Great Britain, residing in Glen Huon, Tasmania, Australia, have invented certain new and useful Improvements in Fruit-Graders, of which the following is a specification.

This invention relates to improvements in fruit grading machines and more particularly to those machines wherein apples and the like are graded.

The apparatus consists of a large open cylinder that is rotated by any convenient means, and in which are a number of perforations spirally arranged and graduating in size, and internal spiral avenues which include such perforations. A suitable chute or feeding device is employed to convey the fruit to be graded into the cylinder through which it will move along the spiral avenues as the cylinder is rotated. The holes or perforations increase in diameter toward the lower end of the machine and spherical fruit such as apples will, in passing through the cylinder, eventually reach an opening large enough to permit the piece to fall through it onto a canvas chute or conveyer below the cylinder, which will carry the fruit clear of the machine. But in order to thoroughly understand my invention reference is made to the accompanying drawing, in which—

Figure 1 is a side elevation of the machine. Fig. 2 is a transverse sectional elevation of the same, and Fig. 3 a plan, the cylinder having been removed.

A suitable frame 4 supports the carrying rollers 5, 5, upon which the cylinder 6 rests. Lying parallel with one of the rollers 5 is another roller 7 that is in brushing contact with the cylinder, and parallel with that roller again is a third roller 8, which is rotated by means of a crank handle 9 or other equivalent means. All three rollers are geared up through spur wheels 10, and roller 7 may consist of a brush rotating against the cylinder.

Spirally arranged in the cylinder 6 are perforations 11 which begin at the head of the machine near the chute 12 and gradually increase in size until the largest is near the end of the cylinder. Running parallel with the spirally arranged holes are smaller perforations 13 in which cord, twine or other suitable material is threaded as shown in Fig. 2. If a cord 14 is passed through the cylinder diametrically and then through a hole therein, then over the cylinder and backward through the next hole, through the hole on the other side diametrically opposite and so on, from one end of the cylinder to the other, a twisted partition will be formed running the length of the cylinder. If another cord is treated in the same manner starting from the beginning of another parallel spirally arranged set of holes 13, a spiral avenue will be constituted in the cylinder running from end to end thereof. Part of one of the walls of such an avenue is shown in Fig. 2, enough being shown without confusion, to assist, with this description, in understanding the construction of the said avenue, of which there may be five or six or any number according to the diameter of the cylinder and the class of fruit to be graded therein. Having completed one avenue, another is started in the same way from the head of the cylinder and carried right through the same.

The perforations 11 are so disposed in the cylinder relatively to the chute or conveyers 15 below, that fruit of a uniform size will fall through onto one of the chutes, the smallest onto the first, and so on until the largest size is received by the last chute. There may be any number of conveyers 15 according to the grading in the cylinder.

Referring more particularly to the chutes 15 these are composed of canvas or like material and rest upon a central support 16 running longitudinally in the machine, while the outer edges of the canvas are held on other supports 17 parallel with, but lower than 16. At intervals in the canvas are transverse ribs or ridges 18 which mark the chutes the one from the other and in the belly of each sheet I make an incision 19. An apple or other piece of fruit falling through into a chute from the cylinder will therefore roll down the canvas and through the incision 19 to delivery into any suitable receptacle provided for the purpose.

The cylinder 6 merely lies upon the rollers 5, 5, and need have no spindle or other like fittings. It is rotated by frictional contact with the rollers 5 one of which imparts its motion thereto. The cylinder as shown in Fig. 1 should move from right to left. The avenues in the cylinder may be covered with felt or other like shock minimizing substance and the perforations 11 are slightly chamfered to remove the sharp edges from the holes. Should an apple or other piece of fruit become jammed in a hole it will be promptly met, as the cylinder rotates, by the roller 7, which it barely touches, or other like means in the frame, and by such means will be pushed back into its avenue or race to be carried along therein until it arrives at a hole large enough to take it.

In operation, a supply of mixed fruit is placed in the chute 12 down which it will gravitate into the open end of the cylinder 6 where it will be taken into the spiral avenues and as the cylinder rotates, be conducted therealong. On the way through the avenues, in the floor of which are the graduated perforations 11, the smaller pieces will first fall through onto the conveyers 15, until at the end of the cylinder only the largest pieces remain. If there are no perforations large enough to accommodate such fruit provision may be made whereby it will fall out of the end of the cylinder into a suitable receptacle.

Having now particularly described and ascertained the nature of my said invention and in what manner the same is to be performed, I declare that what I claim is:—

In a machine of the kind described, an open rotating cylinder in which rows of perforations are spirally arranged and graduated in size, said cylinder having smaller perforations located between the first mentioned graduated perforations, and cords woven through said smaller perforations and extending diametrically through said cylinder.

In witness whereof I have hereunto signed my name in the presence of two subscribing witnesses.

CHARLES WATSON.

Witnesses:
  W. F. DARLING,
  F. H. E. HEWITT.

---

Copies of this patent may be obtained for five cents each, by addressing the "Commissioner of Patents, Washington, D. C."